United States Patent Office 3,002,998
Patented Oct. 3, 1961

3,002,998
PREPARATION OF 1,3,5-TRIAMINO-2,4,6-TRINITROBENZENE
Lloyd A. Kaplan, Adelphi, and Francis Taylor, Jr., Baltimore, Md., assignors to the United States of America as represented by the Secretary of the Navy
No Drawing. Filed May 13, 1959, Ser. No. 813,039
7 Claims. (Cl. 260—581)
(Granted under Title 35, U.S. Code (1952), sec. 266)

The invention described herein may be manufactured and used by or for the Government of the United States of America for governmental purposes without the payment of any royalties thereon or therefor.

This invention relates generally to the chemical processing art and is more particularly concerned with a new and improved method for the production of 1,3,5-triamino-2,4,6-trinitrobenzene.

It has long been known in the ordnance art that 1,3,5-triamino-2,4,6-trinitrobenzene is useful as an explosive. Prior to this invention it was prepared by treating 1,3,5-trichloro-2,4,6-trinitrobenzene with an alcoholic or aqueous solution of ammonia or by treating pentanitroaniline with ammonia in alcoholic solution to produce 1,3,5-triamino-2,4,6-trinitrobenzene. Both of these methods were not satisfactory when pure 1,3,5-triamino-2,4,6-trinitrobenzene is desired. For example, it has been found that when 1,3,5-triamino-2,4,6-trinitrobenzene is prepared by the prior art methods, the product is contaminated with a mixture of reduction products wherein the nitro group has been reduced as well as the halogen groups replaced. These by-products are very difficult to remove and 1,3,5-triamino-2,4,6-trinitrobenzene containing these impurities decomposes rapidly at temperatures below 500° F. Furthermore, the percentage conversion of 1,3,5-trichloro-2,4,6-trinitrobenzene or 1,3,5-tribromo-2,4,6-trinitrobenzene to 1,3,5-triamino-2,4,6-trinitrobenzene is at best 60% when the reaction is carried out according to the methods of the prior art.

Accordingly, it is one object of this invention to provide a process for the production of 1,3,5-triamino-2,4,6-trinitrobenzene from 1,3,5-trichloro-2,4,6-trinitrobenzene and 1,3,5-tribromo-2,4,6-trinitrobenzene wherein the 1,3,5-triamino-2,4,6-trinitrobenzene produced exhibits excellent thermal stability at 500° F.

An additional object of this invention is to provide a new and improved process for the production of 1,3,5-triamino-2,4,6-trinitrobenzene from 1,3,5-trichloro-2,4,6-trinitrobenzene or 1,3,5-tribromo-2,4,6-trinitrobenzene which results in about 90–100 percent conversion of the starting materials without formation of reduction products thereof which inhibit the high temperature stability of the product.

Another object is the provision of a new and improved process for the manufacture of 1,3,5-triamino-2,4,6-trinitrobenzene which requires a short reaction time.

The novel features of this invention are: employing dry gaseous ammonia to replace the halogen atoms of the 1,3,5-tribromo-2,4,6-trinitrobenzene or 1,3,5-trichloro-2,4,6-trinitrobenzene with amino groups and the use of an aliphatic or aromatic hydrocarbon, or an ether as the solvent in place of the hydroxylic solvent employed in the prior art processes. These changes produce a purer product in a shorter time. Optionally, a short reflux period may be included to increase the yield.

The following examples are given by way of illustration only and are not intended to limit the scope of this invention but are set forth only for the purpose of indicating several typical ways of practicing this invention.

EXAMPLE I

At room temperature, to 315 ml. of benzene was added 31.5 grams of 1,3,5-trichloro-2,4,6-trinitrobenzene. The 1,3,5-trichloro-2,4,6-trinitrobenzene is soluble in benzene and readily forms a solution upon stirring. Gaseous ammonia was bubbled through the mixture for 1 hr. Immediately upon addition of the ammonia, 1,3,5-triamino-2,4,6-trinitrobenzene commences to precipitate out of the solution and the reaction became mildly exothermic. After an hour the mixture was refluxed, filtered hot and the bright yellow solid (1,3,5-triamino-2,4,6-trinitrobenzene) was collected. This product was washed with benzene followed by repeated washings with distilled water until it was halogen free. It was then dried in vacuo at 100° C. The 1,3,5-triamino-2,4,6-trinitrobenzene thus formed was found to weigh 24.5 grams indicating a percent conversion of 1,3,5-trichloro-2,4,6-trinitrobenzene to 1,3,5-triamino-2,4,6-trinitrobenzene of 95.

Although benzene may be the preferred solvent for the preparation of 1,3,5-triamino-2,4,6-trinitrobenzene, any other liquid aliphatic, aromatic hydrocarbon, or ether may be used as the solvent provided that the starting material is soluble therein at room temperatures and provided further that the solvent does not react with the ammonia gas at room temperatures to produce products containing a hydroxyl group. For example, ethers such as dioxane, ethylene glycol dimethyl ether, and diethyl ether may be used as the solvent. Hydrocarbons such as benzene, xylene, toluene cyclohexane, hexane, or heptane have all been found suitable for use as the solvent.

The aromatic hydrocarbon solvents are generally preferred over the aliphatic hydrocarbons only because the trihalo trinitrobenzene is generally more soluble in the aromatic hydrocarbons than in the usual aliphatic hydrocarbons. A greater quantity of aliphatic hydrocarbon solvent must therefore be used to dissolve an amount of trihalo trinitrobenzene which could be dissolved in a small quantity of aromatic hydrocarbon solvent. Neglecting the economics of the process however, the aliphatic solvents have been found to be suitable.

EXAMPLE II

In 300 ml. of xylene was dissolved 30.9 grams of 1,3,5-trichloro-2,4,6-trinitrobenzene, the solution was stirred while gaseous ammonia was bubbled into the mixture. The gaseous ammonia immediately reacted with the mixture to produce a precipitate of 1,3,5-triamino-2,4,6-trinitrobenzene. After the reaction had taken place for about an hour the 1,3,5-triamino-2,4,6-trinitrobenzene was filtered from the mixture, washed with heptane and then water till halogen free and dried in vacuo. The 1,3,5-triamino-2,4,6-trinitrobenzene produced by this method weighed 24.1 grams indicating a percentage conversion only slightly less than the percent conversion in Example I. This percent conversion is far superior to the results which could be expected by practising the prior art processes.

EXAMPLE III 150 ml. of dioxane was saturated with ammonia gas at room temperature; to this solution was added a solution of 20 grams of 1,3,5-trichloro-2,4,6-trinitrobenzene dissolved in 200 ml. of dioxane. The mixture was stirred while ammonia gas bubbled into the reaction vessel and into the mixture. Throughout the addition of the gas, 1,3,5-triamino-2,4,6-trinitrobenzene precipitated out of the mixture. After about an hour the vessel was refluxed, and the reactants were filtered hot to collect the 1,3,5-triamino-2,4,6-trinitrobenzene which was then washed with dioxane and then distilled water till halogen free and dried in vacuo at 100° C. The 1,3,5-triamino-2,4,6-trinitrobenzene produced weighed 16 grams.

EXAMPLE IV

About 31.3 grams of 1,3,5-tribromo-2,4,6-trinitrobenzene was dissolved in 310 ml. of benzene; gaseous ammonia was bubbled into the solution as it was stirred constantly. After a one hour reaction period, the mixture was filtered to collect the 1,3,5-triamino-2,4,6-trinitrobenzene which was washed with benzene and then water till halogen free and dried in vacuo at 100° C. to yield 18 grams of 1,3,5-triamino-2,4,6-trinitrobenzene.

This process provides many advantages over the prior art for example, the product is not contaminated with a mixture of reduction products as it is when the reaction is carried in an hydroxylic solvent. The only impurities in the product when a hydrocarbon solvent is employed are unreacted starting material, 1-amino-3,5-dihalo-2,4,6-trinitrobenzene, and 1-halo-3,5-diamino-2,4,6-trinitrobenzene all of which are readily extracted from the product. These impurities may be converted to 1,3,5-triamino-2,4,6-trinitrobenzene by the reaction with ammonia, hence the solvent may be recycled. Furthermore, the reaction time is much shorter than with hydroxylic solvents and the conversion to a much purer product occurs in higher yields. All that is required of the solvents is that 1,3,5-trichloro-2,4,6-trinitrobenzene and 1,3,5-tribromo-2,4,6-trinitrobenzene be soluble at room temperatures and, in the case where they are used in place of hydrocarbons, that they do not react with ammonia gas to produce products containing an hydroxyl group which will interfere with the reaction. Of course, it is necessary that the solvent be a liquid at room temperature so that the trihalotrinitrobenzenes can be dissolved therein.

It should be borne in mind that it is essential that hydroxylic groups must be excluded from the reaction mixture. For example, a series of tests were conducted to determine the effect of employing aqueous ammonia on the yield and purity of the 1,3,5-triamino-2,4,6-trinitrobenzene produced. The results are set forth in the following Table 1.

Table 1

| Method of addition of ammonia | Percent Yield TATB | Percent Chlorine [1] in Product |
| --- | --- | --- |
| dry gas | 89.5 | |
| Do | 85 | 0.4 |
| aqueous solution (28%) | 19.7 | 1.0 |
| Do | 44 | |

[1] Refers to mixtures of $NH_4Cl$, 1-amino-3,5-dihalo-2,4,6-trinitrobenzene, and 1-halo-3,5-diamino-2,4,6-trinitrobenzene.

As can be readily seen from this table, the yield of 1,3,5-triamino-2,4,6-trinitrobenzene was decreased by a factor of 2 when an aqueous solution of ammonia is employed, as suggested by U.S. Patent 2,305,573, Klysstein et al. Furthermore, the product can be contaminated with larger amounts of chlorine when aqueous ammonia is substituted for the dry gas. This is an index of the purity of the product. As stated hereinabove, the purer the 1,3,5-triamino-2,4,6-trinitrobenzene, the better is its thermal stability.

The low yields obtained with aqueous ammonia solutions are due to the large amounts of water soluble organic by-products formed in the reaction. From the nature of these materials, their chemical properties show them to be polynitro-mono- or polyhydroxy-benzenes, it is apparent that they are formed by the hydrolysis of the trihalo-trinitrobenzene by the water present in the ammonia used.

The 1,3,5-triamino-2,4,6-trinitrobenzene produced in Example I was screened through a 30 mesh standard sieve and pressed with a hydraulic press into a missile warhead space of a 4 inch diameter by 10 inch deep to a bulk density of at least 1.6. This required a pressure of 15,000 p.s.i. A cylindrical well was left on top of the charge and a tetryl booster explosive pellet 1.1 inches diameter and 3 inches deep was inserted in this well. The booster in turn contained a well fitted with an Engineer Special Electric Blasting Cap. Upon initiation of the cap, the explosive charge detonated with extreme violence throwing steel fragments of the warhead at high velocity and causing great destruction in the immediate surroundings by the concussion effects of the blast and the shrapnel effect of the steel fragments. It is to be understood, of course, that the particular blasting cap could be replaced with any suitable fuze.

The 1,3,5-triamino-2,4,6-trinitrobenzene is especially suitable for use in missiles because of its high thermal stability. For example, several grams of the 1,3,5-triamino-2,4,6-trinitrobenzene produced according to this method were heated to 500° F. for over 1 hour, no appreciable decomposition or gasification of the material was observed. On the other hand, when impure 1,3,5-triamino-2,4,6-trinitrobenzene manufactured according to the aforedescribed prior art processes was heated up to 500° F. it decomposed very rapidly and was completely reacted after a few minutes. It should therefore be apparent that this method is especially desirable when the 1,3,5-triamino-2,4,6-trinitrobenzene is to be used in a missile wherein high thermal gradients can be expected as the missile moves through the atmosphere. However, it is by no means limited to such use, it could also be used as a solid matrix in a castable slurry of molten TNT. The slurry could be poured into a mold of any desired size and shape. When properly boostered with tetryl or a similar booster of suitable size it may be initiated by a fuze or blasting cap designed in accordance with techniques well known to those skilled in the art. This type charge explodes with greater violence than the same weight of TNT. This has been verified by detonation velocity measurements which indicate that 1,3,5-triamino-2,4,6-trinitrobenzene is about 10% more powerful than TNT at 95% of crystal density.

The above mentioned process may be used to prepare explosive charges for military service. However, this material is by no means so limited; for example the charges may be used in mining, seismic prospecting and in virtually any construction or demolition project as well as many other applications wherein an explosive is desirable.

It should be apparent to those skilled in the art upon reading and understanding the foregoing specification, that this invention provides a novel process for the fabrication of 1,3,5-triamino-2,4,6-trinitrobenzene and that the only requirements for this process are that the ammonia be added as a dry gas and that the solvent be an aliphatic or aromatic hydrocarbon which is liquid at room temperature and which dissolves 1,3,5-tribromo-2,4,6-trinitrobenzene or 1,3,5-trichloro-2,4,6-trinitrobenzene, or an ether which is liquid at room temperature and dissolves 1,3,5-tribromo-2,4,6-trinitrobenzene or 1,3,5-trichloro-2,4,6-trinitrobenzene and which does not react with ammonia gas at room temperature to yield products containing an hydroxyl group. It is essential that any hydroxyl groups in the form of water, alcohols or carboxylic groups be excluded from the reaction mixture at all times.

It is apparent from the examples given that many different solvents may be employed. It is therefore not the intent of this application to attempt to set forth a comprehensive catalog of the compositions useful as solvents but to describe the invention in its broader aspects. The invention lies in the the use of the solvent having the hereinabove described properties and their individual compositions is important only in the sense that the individual properties of the elements of a mechanical assemblage are important to their proper combination and coaction. To formulate a set of specifications for the solvent composition in the light of the present disclosure will call for mere routine chemical knowledge and skill. From his knowledge, a chemist can predict with confidence solvents suitable for practicing this invention. Accordingly, the foregoing detailed description of the materials which may be useful in performing this invention and the specific examples cited are not to be construed as limiting this invention in any way, rather they are illustrative only and the scope of the invention is to be determined only by the scope of the appended claims.

What is claimed as new and desired to be secured by Letters Patent of the United States is:

1. The process of producing 1,3,5-triamino-2,4,6-trinitrobenzene from a starting material selected from the group consisting of 1,3,5-trichloro-2,4,6-trinitrobenzene and 1,3,5-tribromo-2,4,6-trinitrobenzene which comprises; dissolving the starting material in a solvent which is inert with respect to the starting materials and ammonia to form a solution, adding gaseous ammonia to the solution, removing 1,3,5-triamino-2,4,6-trinitrobenzene from the solution.

2. A process for the production of 1,3,5-triamino-2,4,6-trinitrobenzene comprising; dissolving a 1,3,5-trihalo-2,4,6-trinitrobenzene selected from the group consisting of 1,3,5-trichloro-2,4,6-trinitrobenzene and 1,3,5-tribromo-2,4,6-trinitrobenzene in a solvent selected from the group consisting of liquid hydrocarbons and ethers in which the 1,3,5-trihalo-2,4,6-trinitrobenzene is soluble at room temperature and which do not react with ammonia gas at room temperatures to yield products containing hydroxyl groups, and bubbling ammonia gas through the solution.

3. A process of producing 1,3,5-triamino-2,4,6-trinitrobenzene which comprises; dissolving a trihalo-trinitrobenzene selected from the group consisting of 1,3,5-trichloro-2,4,6-trinitrobenzene and 1,3,5-tribromo-2,4,6-trinitrobenzene in a solvent selected from the group consisting of liquid hydrocarbons, and liquid ethers which do not react with ammonia gas to form hydroxylic products, adding dry ammonia gas to the solution of the trihalotrinitrobenzene.

4. The process of claim 3 further comprising the steps of refluxing the solution then filtering 1,3,5-triamino-2,4,6-trinitrobenzene from the solution.

5. The process of preparing 1,3,5-triamino-2,4,6-trinitrobenzene comprising; dissolving 1,3,5-trichloro-2,4,6-trinitrobenzene in benzene, bubbling dry ammonia gas through the benzene solution of 1,3,5-trichloro-2,4,6-trinitrobenzene for about one hour, refluxing the benzene solution, removing solid 1,3,5-triamino-2,4,6-trinitrobenzene from the solution and washing the 1,3,5-triamino-2,4,6-trinitrobenzene thus removed from the solution.

6. The process of preparing 1,3,5-triamino-2,4,6-trinitrobenzene which comprises; saturating dioxane with dry ammonia gas, to form a first solution, dissolving 1,3,5-trichloro-2,4,6-trinitrobenzene in dioxane to form a second solution, mixing the first and second solutions, bubbling dry ammonia gas through the mixture to produce 1,3,5-triamino-2,4,6-trinitrobenzene, recovering the 1,3,5-triamino-2,4,6-trinitrobenzene.

7. The process of claim 6 wherein the ammonia gas is bubbled through the mixture for about one hour and the mixture is then refluxed.

References Cited in the file of this patent

UNITED STATES PATENTS

| 1,423,494 | Haas | July 18, 1922 |
| 2,104,983 | Frye | Jan. 11, 1938 |

OTHER REFERENCES

Backer et al.: "Rec. Trav. Chim.," 56, pages 1161–71 (1937), Abstracted in Chem. Abs. 32, 1669 (1938).